United States Patent [19]

Estabrook et al.

[11] 4,421,647
[45] Dec. 20, 1983

[54] FILTER WITH INDEXABLE FILTER WEB

[75] Inventors: Mark R. Estabrook; James I. Marchman, both of Rockford, Ill.

[73] Assignee: Barnes Drill Co., Rockford, Ill.

[21] Appl. No.: 393,075

[22] Filed: Jun. 28, 1982

[51] Int. Cl.³ .......................................... B01D 33/32
[52] U.S. Cl. .................................. 210/387; 210/401
[58] Field of Search ............. 210/297, 298, 387, 400, 210/401

[56] References Cited

U.S. PATENT DOCUMENTS

| | | | |
|---|---|---|---|
| 2,720,973 | 10/1955 | Gross | 210/1.5 |
| 3,333,693 | 8/1967 | Hirs | 210/387 |
| 3,489,679 | 1/1970 | Davidson et al. | 210/387 |
| 3,756,411 | 9/1973 | Kracklauer | 210/401 |
| 4,005,018 | 1/1977 | Wyman et al. | 210/387 |
| 4,062,780 | 12/1977 | Estabrook | 210/401 |
| 4,110,218 | 8/1978 | Marriott et al. | 210/223 |

*Primary Examiner*—Peter A. Hruskoci

*Attorney, Agent, or Firm*—Leydig, Voit, Osann, Mayer & Holt, Ltd.

[57] ABSTRACT

An indexable filter web is advanced downwardly into and then upwardly out of a pool of dirty coolant by a perforated flexible belt. Rotatable wheels shape the belt and the web into a circular configuration with the bottom of the web defining the bottom of a clean coolant pool located inside of the web and within the dirty coolant pool. The pressure of the coolant in the dirty pool forces the dirty coolant through the web, the coolant being filtered by the web and flowing into the clean pool for subsequent discharge into a clean tank. The sides of the clean pool are defined in part by stationary ring-like elements which coact with the side edges of the belt to form grooves for receiving the side margins of the web. The pressure of the dirty coolant forces the side margins of the web into the grooves and causes the side margins of the web to seal themselves to the ring-like elements so that coolant is prevented from flowing into the clean pool without passing through and being filtered by the web.

10 Claims, 6 Drawing Figures

FILTER WITH INDEXABLE FILTER WEB

BACKGROUND OF THE INVENTION

This invention relates in general to a filter for separating particles from a flow of dirty liquid such as machine tool coolant. More particularly, the invention relates to a filter of the type in which an indexable filter web made of paper, fabric or the like is carried along a curved path through a tank of liquid by a flexible and endless perforated conveyor such as, for example, a so-called Cambridge belt. Filtering occurs as liquid from a dirty pool passes through the filter web. When the active portion of the web becomes clogged with particles, the web is indexed by the conveyor to bring a clean length of web into the filtering area.

A filter of the foregoing general type is disclosed in Gross U.S. Pat. No. 2,720,973. That filter is a gravity filter in that dirty liquid is located above the filter web and flows downwardly through the web by gravity and into a clean pool beneath the web. The web and the conveyor are supported by a pair of laterally spaced discs which form the web into a curved pocket. The conveyor presses the side margins of the web against the peripheral surfaces of the discs to seal the web to the discs and prevent liquid from flowing from the dirty pool to the clean pool without passing through the web and being filtered. When the web is indexed, the discs rotate and, as an incident thereto, the web and conveyor move with the discs.

SUMMARY OF THE INVENTION

The present invention provides a simplified and relatively inexpensive filter in which the indexable web and conveyor are shaped into a drum-like structure which is immersed in the dirty liquid pool and which forms a clean liquid pool within the dirty liquid pool. Filtering occurs as the pressure of the liquid in the dirty pool forces the liquid through the web and into the clean pool.

Such pressure is used to advantage to seal the side margins of the web in a unique manner against stationary curved sealing surfaces at the sides of the clean liquid pool so as to insure that all liquid which flows between the dirty and clean pools is forced to pass directly through the filter web. As a result, the pressure of the dirty liquid is used to enhance sealing of the web rather than opposing the sealing action as is the case in a gravity filter. This enables a better seal to be maintained, simplifies the mechanical structure for establishing the seal, and results in less wear on the sealing surfaces and the endless conveyor.

In a more detailed sense, the invention resides in a filter of the above type in which the indexable conveyor coacts with novel stationary sealing surfaces at the sides of the clean liquid pool to define annular grooves for receiving the side margins of the filter web and for enabling such side margins to be effectively sealed by the pressure of the liquid in the dirty pool.

A further advantage of the invention involves the novel use of the conveyor and the sealing surfaces to facilitate initial threading of the web.

These and other advantages of the invention will become more apparent from the following detailed description when taken in conjunction with the accompanying drawings.

DETAILED DESCRIPTION OF THE PREFERRED EMBODIMENT

Figure 1:
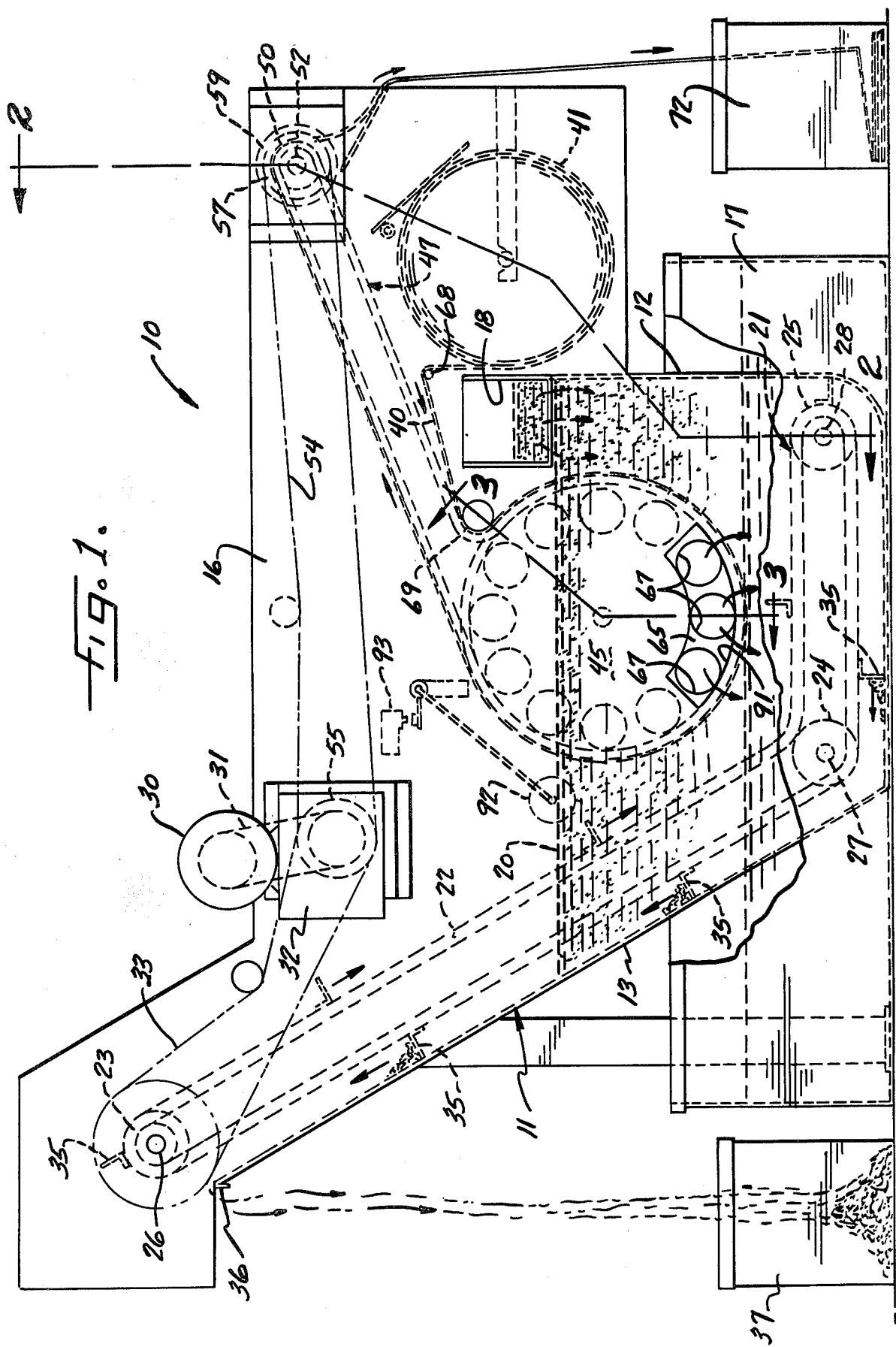
FIG. 1 is a side elevational view of a new and improved filter incorporating the unique features of the present invention, certain parts of the filter being broken away and shown in section.

As shown in the drawings for purposes of illustration, the invention is embodied in a filter 10 for separating chips, particles and other contaminants from a flow of liquid such as dirty machine tool coolant. The filter includes a dirty coolant tank 11 having a pair of end walls 12 and 13 (FIG. 1), a bottom wall 14 (FIG. 2) and a pair of laterally spaced side walls or members 15 and 16. The dirty coolant tank is disposed inside of a wider but shallower clean coolant tank 17 (FIGS. 1 and 2) which receives the coolant after the latter has been filtered.

Dirty coolant is delivered to the dirty coolant tank 11 by way of a laterally extending trough 18 (FIGS. 1 and 2) and spills out of the trough and into the tank 11 so as to form a dirty coolant pool 20 (FIGS. 1 and 3) in that tank. Chips and heavier particles settle to the bottom of the pool 20 and are removed from the tank 11 by a drag conveyor 21 (FIGS. 1 and 3). The drag conveyor per se does not form part of the present invention and thus will be described only briefly herein. Simply stated, the drag conveyor comprises a pair of laterally spaced endless chains 22 which are trained around pairs of sprockets 23, 24 and 25 (FIG. 1) on three laterally extending shafts 26, 27 and 28, respectively. The uppermost pair of sprockets 23 is adapted to be rotated by an electric motor 30 supported on the outside of the tank 11 and connected to the shaft 26 by way of a belt 31, a speed reducer 32 and a drive chain 33.

Several spaced bars 35 (FIGS. 1 and 2) extend laterally between and are secured to the chains 22 of the drag conveyor 21. When the motor 30 is energized to advance the chains in the direction of the arrows shown in FIG. 1, the bars move along the bottom wall 14 of the tank 11 to scrape chips and other heavy particles therefrom. The bars then carry the chips upwardly along the end wall 13 of the tank 11 until the chips reach the upper edge 36 of the end wall. At that point, the chips fall over the end wall 13 and drop into a collection bucket 37 located outside of the tank 11 and below the upper edge of the end wall 13. Reference is made to Marriott et al U.S. Pat. No. 4,110,218 for a more detailed disclosure of the construction and operation of a typical drag conveyor.

Small and fine particles which cannot be effectively removed from the dirty coolant by the drag conveyor 21 are separated from the dirty coolant by a filter web 40. The web is made of porous filter media such as paper or non-woven fabric and is stored on a rotatable supply roll 41 which is supported on the outside of the tank 11.

In accordance with the present invention, the filter web 40 is guided into and is supported and immersed within the dirty coolant pool 20 in a unique manner which enables the filtering action to be effected by the pressure of the coolant in the dirty coolant pool. The invention is particularly characterized in that (1) the immersed web 40 in the dirty pool 20 forms part of a pool 45 (FIG. 3) for clean coolant within the dirty pool itself and (2) the pressure of the coolant in the dirty pool is advantageously used to cause the side margins of the web to form an effective seal between the dirty and clean pools 20 and 45 so that coolant from the dirty pool cannot flow into the clean pool without passing through and being filtered by the web.

More specifically, the web 40 is carried on one side of a flexible and perforated endless conveyor 47. The preferred conveyor which is used herein is a so-called Cambridge belt. Such a belt is formed by longitudinally and transversely extending rows of pivotally connected grids 48 (FIG. 4) defining grid-like openings having dimensions of approximately one inch by one-half inch. The present belt 47 is virtually identical in structure to the Cambridge belts disclosed in Estabrook U.S. Pat. No. 4,062,780 and in Marriott et al U.S. Pat. No. 4,110,218.

Figure 2:
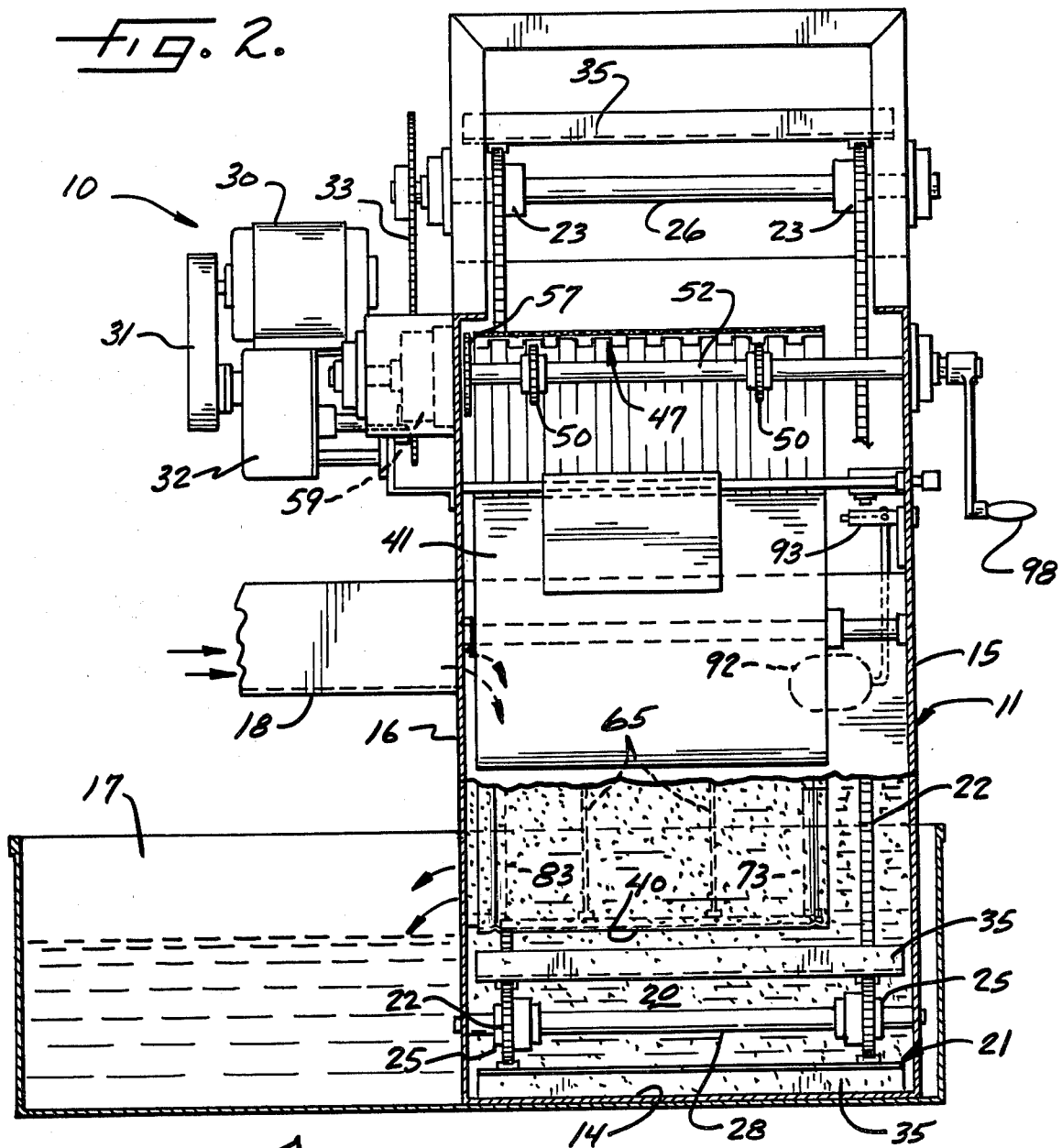
FIG. 2 is a fragmentary cross-section taken substantially along the line 2—2 of FIG. 1.
Figure 3:
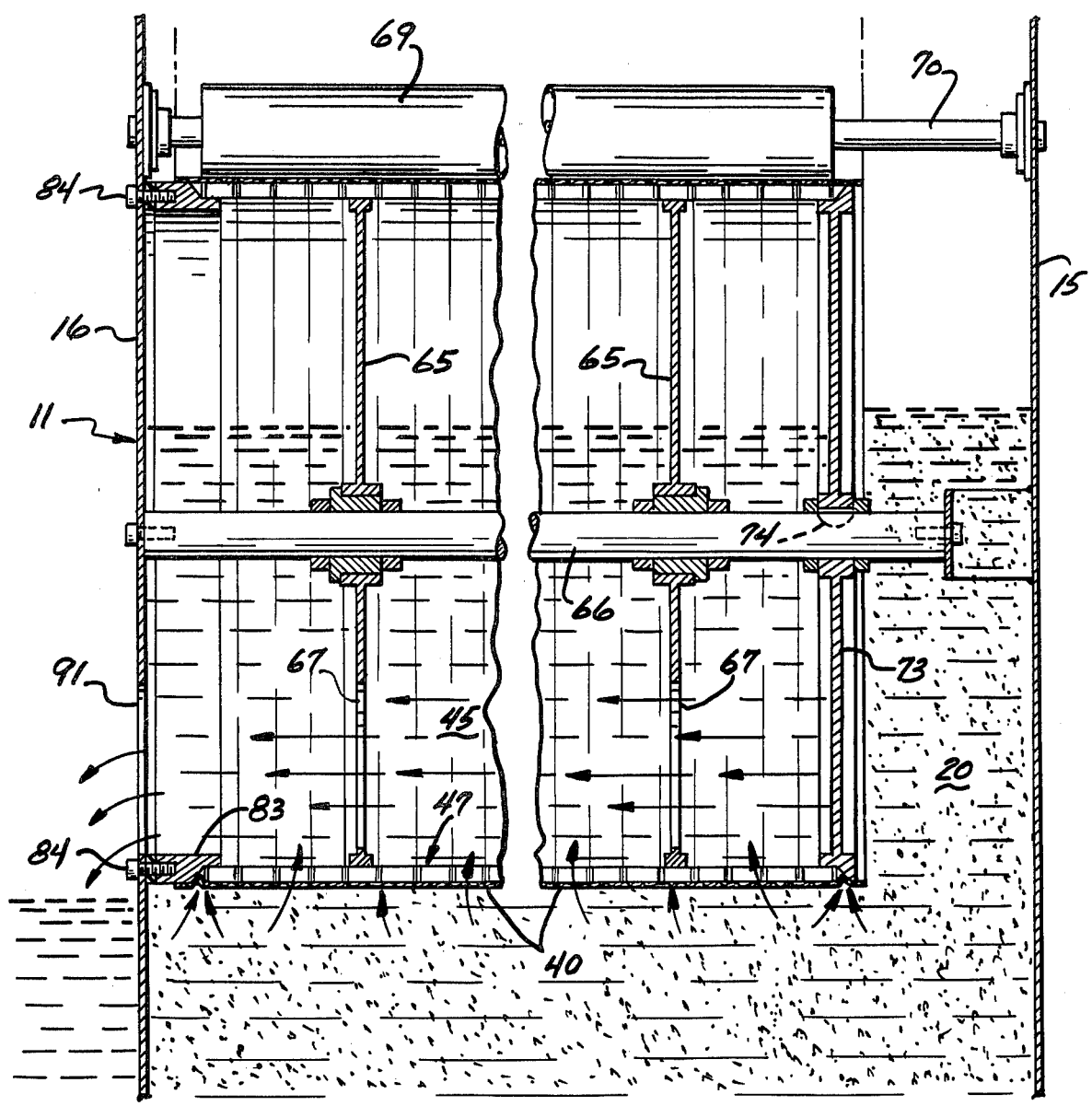
FIG. 3 is an enlarged fragmentary cross-section taken substantially along the line 3—3 of FIG. 1.

As shown in FIGS. 1 and 2, the Cambridge belt 47 is trained around a pair of sprockets 50 which are secured to a transversely extending shaft 52 supported rotatably by the tank 11. The shaft is adapted to be rotated by a drive chain 54 (FIG. 1) which is trained around a first sprocket 55 on the output of the speed reducer 32 and around a second sprocket 57 on the input of an electric clutch 59 (FIGS. 1 and 2). The clutch is coaxial with the shaft 52 and has its output operably connected to that shaft.

The clutch 59 normally is disengaged and thus the belt 47 and the shaft 52 are normally stationary during operation of the drag conveyor 21. When the filter web 40 becomes heavily clogged, however, the clutch is automatically engaged for a predetermined period of time in order to rotate the shaft 52 and cause the belt to pull an additional length of web from the supply roll 41 and to advance a clean length of web into the filtering area in the dirty coolant pool 20. The manner in which the clutch is automatically engaged will be explained subsequently.

In keeping with the invention, the Cambridge belt 47 is guided along a curved path downwardly into and then upwardly out of the dirty pool 20 and carries the web 40 in such a manner that the web forms a curved bottom for the clean coolant pool 45. For this purpose, two or more laterally spaced wheels 65 (FIG. 3) are rotatably mounted on a stationary shaft 66 which extends laterally between and is secured to the side walls 15 and 16 of the tank 11. One side of the belt 47 extends around and engages the wheels from approximately a one o'clock position to approximately a twelve o'clock position. Accordingly, the wheels 65 support the belt in such a manner as to cause the belt to form a generally cylindrical drum-like structure within the dirty tank 11. The belt frictionally engages the wheels and thus the wheels rotate when the belt is indexed.

Each of the wheels 65 herein is circular in shape although the wheels could be formed with other curved shapes. For example, the wheels could be slightly elliptical. For a purpose to be explained subsequently, several angularly spaced and axially extending openings 67 (FIGS. 1 and 3) are formed through each of the wheels 65.

Upon leaving the supply roll 41, the web 40 passes over a guide roller 68 (FIG. 1) and then passes around a rotatable pressure roller 69 (FIGS. 1 and 3) located just above the wheels 65 at about a one o'clock position. The pressure roller 69 is rotatably supported on a shaft 70 (FIG. 3) which extends transversely between and is secured to the side walls 15 and 16 of the tank 11.

As shown in FIG. 1, the belt 47 also passes around the pressure roller 69 just before the belt starts to engage the wheels 65. At the pressure roller, the web 40 becomes sandwiched between the pressure roller and the side of the belt opposite the side which engages the wheels. Thus, the pressure roller establishes tight contact between the web and the belt and, in addition, acts through the web to guide the belt into pressing engagement with the wheels. The pressure roller is located above the level of the coolant in the tank 11 to enable initial threading of the web.

By virtue of the belt 47 and the wheels 65, the web 40 is guided downwardly into and then upwardly out of the dirty coolant pool 20 and extends along an arcuate path within that pool. As stated, the web engages the side of the belt opposite of the side which engages the wheels and thus that portion of the web which is within the dirty coolant pool 20 underlies the belt. When the belt is indexed, the web is carried along with the belt and, as the web moves upwardly out of the pool 20, it becomes located on top of the belt. The dirty web leaves the belt at a point adjacent the shaft 52 and then drops into a collection bucket 72 (FIG. 1) located outside of the tank 11.

With the above-described arrangement, the web 40 forms an arcuate bottom for the clean coolant pool 45 which is located within the dirty coolant pool 20. The pressure of the coolant in the latter pool forces the coolant to flow through the web and into the clean coolant pool with the coolant being filtered by the web during such flow.

Figures 4, 5:
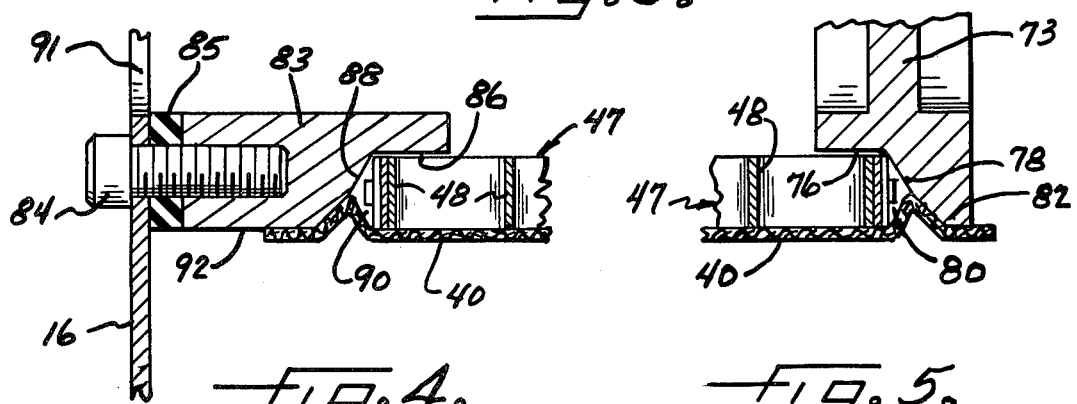
FIGS. 4 and 5 are enlarged views of certain parts illustrated in FIG. 3 and show the web in sealing relation with the conveyor and with the stationary sealing surfaces.

According to an important aspect of the invention, the sides of the clean coolant pool 45 are formed by stationary members which coact uniquely with the belt 47 to enable pressure seals to be formed at the side margins of the web 40, such seals preventing coolant from flowing directly from the dirty pool 20 to the clean pool 45 without passing through the web. As shown in FIGS. 3 and 5, one of the stationary members for forming one side of the clean coolant pool 45 constitutes a stationary and non-porous disc 73 which herein is circular in shape. The disc 73 is spaced laterally inwardly from the side wall 15 of the tank 11 and is mounted on the shaft 66. A key 74 prevents the disc 73 from rotating on the shaft.

In carrying out the invention, the disc 73 is formed with an inwardly and laterally extending surface or flange 76 (FIG. 5) which is horizontal in the axial direction. In the circumferential direction, the flange is circular and is concentric with the peripheries of the wheels 65. The flange 76 extends around one side margin of the belt 47 as shown most clearly in FIG. 5. While the outer diameter of the flange 76 could be the same as the outer diameter of each wheel 65, the flange preferably is somewhat smaller in diameter than the wheels so as to establish a small radial space between the flange and the belt. As a result, the belt does not tightly engage the flange when the belt is indexed. The pressure of the coolant in the dirty coolant pool 20 may deflect the side margin of the belt into light contact with the flange but such contact is not sufficiently great to appreciably retard advancement of the belt or to cause any significant wear on either the belt or the flange. The flange does prevent the pressure from deflecting the belt through any significant angle.

As shown in FIG. 5, the periphery of the disc 73 also is formed with an inclined surface 78 which is sloped outwardly at an angle of about 120 degrees relative to the flange 76. The inclined surface 78 is located alongside the extreme side edge of the belt 47 but diverges away from such side edge upon progressing outwardly. Thus, the inclined surface and the side edge of the belt coact to form a generally V-shaped groove 80 adjacent the side edge of the belt. At its outer end, the inclined surface 78 leads into a second surface or flange 82 which is spaced radially and laterally outwardly from the flange 76. The flange 82 is concentric with the flange 76 and is located so as to coincide with the outer side of the belt 47.

With the foregoing arrangement, one side margin of the web 40 is positioned as shown in FIG. 5 with such side margin extending laterally beyond the side edge of the belt 47, spanning the groove 80 and lying on the flange 82. When the web 40 enters the dirty coolant pool 20, the pressure of the dirty coolant therein acts against the side margin of the web and forces the web into the groove 80 as illustrated in FIG. 5. Thus, a substantially V-shaped crimp is placed in the side margin of the web. The web is pressed into sealing engagement with the inclined surface 78 and with the flange 82 to prevent liquid from the dirty pool 20 from flowing into the clean pool 45 without passing through the web.

A very similar arrangement is used to seal the other side of the clean coolant pool 45. While a stationary disc somewhat similar to the disc 73 could be used to form the other side of the clean pool, such side herein is advantageously formed by the stationary side wall 16 of the tank 11 itself (see FIGS. 3 and 4). To enable sealing of the web 40 adjacent the side wall 16, a ring-like element 83 (FIGS. 3 and 4) is secured to the inner side of the side wall by screws 84 and an annular gasket 85. The ring 83 is formed with a flange 86, an inclined surface 88 and a laterally extending surface 92 which correspond in shape and in relative positioning to the flange 76, the inclined surface 78 and the flange 82, respectively, of the disc 73. A V-shaped groove 90 is defined between the inclined surface 88 and the adjacent side edge of the belt 47 and receives the side margin of the web 40 when the pressure in the dirty coolant pool 20 acts against the web. The side margin of the web seals against the surfaces 88 and 92 as shown in FIG. 5 to insure that all of the dirty coolant flows through the web as such coolant passes into the clean coolant pool 45.

In operation, the pressure in the dirty coolant pool 20 forces the dirty coolant through the web 40 and into the clean coolant pool 45 so that the coolant is filtered by the web. The coolant in the clean pool 45 flows from right-to-left (FIG. 3) and some of the coolant flows through the openings 67 in the wheels 65. The openings thus define flow passages which allow the clean coolant to flow through the wheels 65 and toward the side wall 16 of the tank 11. Formed in the side wall 16 is an outlet opening 91 (FIGS. 1 and 3) which enables the clean coolant to escape from the clean coolant pool 45 and to pour into the clean coolant tank 17.

As the web 40 becomes progressively clogged with particles, flow through the web becomes progressively more restricted. As a result, the level of coolant in the dirty coolant pool 20 rises. When the dirty coolant rises to a certain level, a float 92 (FIGS. 1 and 2) in the dirty coolant pool 20 actuates a switch 93 which is operably associated with the float. Actuation of the switch effects energization and engagement of the clutch 59 to turn the shaft 52 and thereby effect indexing of the web 40 and the belt 47. Thus, the dirty web is advanced out of the dirty coolant pool 20 and a clean section of web is supplied to that pool. As the web indexes, its side margins ride within the V-shaped grooves 80 and 90 and remain sealed to the surfaces 78, 82, 88 and 92 as long as the web is in the dirty coolant and is acted upon by the pressure thereof. Thus, a good seal is maintained at the side margins of the web during indexing of the web.

From the foregoing, it will be apparent that the present invention brings to the art a new and improved filter 10 in which the wheels 65 form the web 40 and the belt 47 into a drum-like structure in the dirty coolant pool 20 and in which the clean pool 45 is defined inside of such structure and within the dirty pool. The pressure of the coolant in the dirty pool effects the seals at the side margins of the web and does not act in opposition to such seals as in the case of a gravity filter. As a result, the filter 10 is simplified because no mechanical elements are required for positively holding the web in a sealed condition and for maintaining the web in precise relationship with sealing surfaces. The belt 47 need not be tensioned so tightly as to resist the weight of the coolant while still maintaining a seal and thus the belt may operate with relatively low tension and will experience a comparatively long service life.

Figure 6:
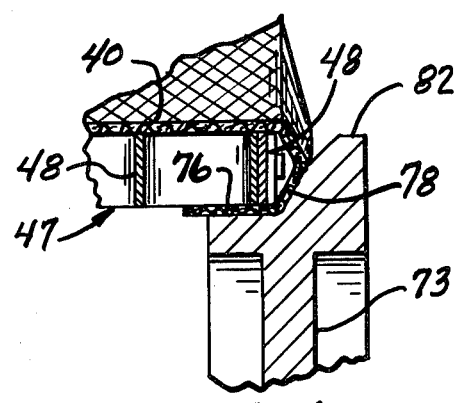
FIG. 6 is a view somewhat similar to FIG. 5 but shows the web positioned for initial threading purposes.

The belt 47 and the disc 73 also are used to good advantage during initial threading of the web 40 of a new roll 41. To effect such threading, the web is manually drawn over the guide roller 68 and then is manually threaded between the belt 47 and the pressure roller 69. In the vicinity of the pressure roller, the free end portion of the web is manually shifted laterally on the belt and toward the disc 73 so that a greater than normal portion of the side margin of the web extends laterally beyond the side edge of the belt (see FIG. 6). That portion of the web then is folded downwardly and is sandwiched between the belt 47 and the flange 76 on the disc 73 as shown in FIG. 6. Thus, when the belt 47 is advanced, the free end portion of the web remains pinched between the belt and the flange 76 and causes the web to travel around the wheels 65. Once the free end portion of the web has advanced upwardly out of the dirty coolant pool 20, it may be grasped manually, pulled upwardly to the area of the shaft 52, and then shifted laterally to its normal position on the belt. During threading of the web, the belt is advanced by leaving the clutch 59 disengaged and by turning the shaft 52 manually with a hand crank 98 on the end of the shaft opposite the clutch. Manual turning of the shaft 52 and advancement of the belt during threading enables better control to be maintained over the threading operation than would be the case if the shaft were turned by the motor 30 and the clutch 59.

It should be noted that the formation of one side of the clean coolant pool 45 by means of the disc 73 rather than by the adjacent side wall 15 of the tank 11 enables a substantial space to be left between the side wall 15 of the tank and the disc 73 which defines the side of the clean coolant pool. Such space is shown most clearly in FIGS. 2 and 3 and enables the operator of the filter 10 to have sufficient room to gain access to the disc 73 for the purpose of threading the web. If a different method of threading is used, the disc 73 could be replaced with a ring similar to the ring 83 and secured to the inner side of the side wall 15 of the tank 11. Alternatively, and as stated above, a second disc similar to the disc 73 but with an outlet opening therein could be used in place of the ring 83 but this would somewhat increase the overall cost of the filter 10.

We claim:

1. A filter comprising a tank adapted to contain a pool of dirty liquid to be filtered, means for delivering dirty liquid to said pool, a supply roll of disposable filter web, a flexible and perforated endless conveyor for carrying the web along a curved path downwardly into and then upwardly out of the dirty pool, a pair of laterally spaced and stationary side members defining sides for a pool of clean liquid located within the dirty pool and above the bottom thereof, each of said side members having a laterally extending and stationary curved surface which conforms substantially to the curved path followed by said web as the latter moves through said dirty pool, the side margins of one side of said conveyor being located alongside said curved surfaces, said web being carried on the other side of said conveyor and defining a curved bottom for said clean pool whereby liquid in said dirty pool is filtered upon passing through said web and into said clean pool, the side edges of said conveyor coacting with said side members to define curved grooves between said conveyor and said side members, the side margins of said web extending laterally beyond the side edges of said conveyor and spanning said grooves whereby the pressure of the liquid in the dirty pool forces the side margins of said web into said grooves to cause the web to seal the dirty pool from the clean pool adjacent said side members, and means for removing filtered liquid from said clean pool.

2. A filter as defined in claim 1 in which said grooves are generally V-shaped.

3. A filter as defined in claim 1 in which at least one wheel is rotatably supported between said side members and is formed with axially spaced flow passages, said one side of said conveyor engaging said wheel and being guided by said wheel.

4. A filter as defined in claim 1 in which one of said side members is formed by one wall of said tank, the laterally extending curved surface of such side member being defined on a ring-like element secured to and extending laterally from said one wall of said tank, said ring-like element having a second laterally extending curved surface spaced radially outwardly and laterally outwardly from the first curved surface of said element, and an inclined surface on said ring-like element and extending between the curved surfaces of such element so as to define the outer side wall of the associated groove.

5. A filter as defined in claim 1 in which one of said side members is defined by a disc which is fixed in a stationary position in said tank, an axially extending flange projecting laterally inwardly from the periphery of said disc and defining the laterally extending curved surface of said one side member, said disc having a second laterally extending curved surface spaced radially outwardly and laterally outwardly from the first curved surface of said disc, and an inclined surface on said disc and extending between the curved surfaces of the disc so as to define the outer side wall of the associated groove.

6. A filter comprising a tank adapted to contain a pool of dirty liquid to be filtered, means for delivering dirty liquid to said pool, a supply roll of disposable filter web, a flexible and perforated endless conveyor for carrying the web along an arcuate path downwardly into and then upwardly out of the dirty pool, a pair of laterally spaced and stationary side members defining sides for a pool of clean liquid located within the dirty pool and above the bottom thereof, a circular wheel mounted for rotation between said side members and having axially extending flow passages formed therethrough, one side of said conveyor engaging said wheel and being guided by the wheel along an arcuate path which is concentric with the arcuate path of said web, said web being carried on the other side of said conveyor and defining an arcuate bottom for said clean pool whereby liquid in said dirty pool is filtered upon passing through said web and into said clean pool, the side edges of said conveyor coacting with said side members to define arcuate grooves between said side members and the side edges of said conveyor, the side margins of said web extending laterally beyond the side edges of said conveyor and spanning said grooves whereby the pressure of the liquid in the dirty pool forces the side margins of said web into said grooves to cause the web to seal the dirty pool from the clean pool adjacent said side members, and means for removing filtered liquid from said clean pool.

7. A filter comprising a tank adapted to contain a pool of dirty liquid to be filtered, means for delivering dirty liquid to said pool, a supply roll of disposable filter web, a flexible and perforated endless conveyor for carrying the web along an arcuate path downwardly into and then upwardly out of the dirty pool, a pair of laterally spaced and stationary side members defining sides for a pool of clean liquid located within the dirty pool and above the bottom thereof, a circular wheel mounted for rotation between said side members and having axially extending flow passages formed therethrough, one side of said conveyor engaging said wheel and being guided by the wheel along an arcuate path which is concentric with the arcuate path of said web, said web being carried on the other side of said conveyor and defining an arcuate bottom for said clean pool whereby liquid in said dirty pool is filtered upon passing through said web and into said clean pool, each of said side members having a laterally extending arcuate surface concentric with said wheel and located face-to-face with the side margins of said one side of said conveyor, the side edges of said conveyor coacting with said side members to define arcuate grooves between said side members and the side edges of said conveyor, the side margins of said web extending laterally beyond the side edges of said conveyor and spanning said grooves whereby the pressure of the liquid in the dirty pool forces the side margins of said web into said grooves to cause the web to seal the dirty pool from the clean pool adjacent said side members, and means for removing filtered liquid from said clean pool.

8. A filter as defined in claim 7 in which the radius of each of said arcuate surfaces is slightly less than the radius of said wheel.

9. A filter as defined in claim 7 in which a plurality of circular wheels is mounted for rotation between said side members and engage said one side of said conveyor to guide said conveyor along its arcuate path, each of said wheels having axially extending flow passages formed therethrough.

10. A filter as defined in claim 7 in which one of said side members is defined by a rotationally stationary circular disc spaced laterally inwardly from the adjacent side wall of said tank.

* * * * *